(12) United States Patent
Wang et al.

(10) Patent No.: US 11,293,407 B1
(45) Date of Patent: Apr. 5, 2022

(54) CIRCULAR CAN-SHAPE FOUNDATION AND CONSTRUCTION METHOD FOR ONSHORE WIND TURBINES

(71) Applicants: Dongyuan Wang, Austin, TX (US); Jixiang Li, Chengdu (CN); Long Shi, Chengdu (CN)

(72) Inventors: Dongyuan Wang, Austin, TX (US); Jixiang Li, Chengdu (CN); Long Shi, Chengdu (CN)

( * ) Notice: Subject to any disclaimer, the term of this patent is extended or adjusted under 35 U.S.C. 154(b) by 0 days.

(21) Appl. No.: 17/080,816

(22) Filed: Oct. 26, 2020

(51) Int. Cl.
  *F03D 13/20*    (2016.01)
  *E02D 27/42*    (2006.01)
  *E04H 12/12*    (2006.01)

(52) U.S. Cl.
  CPC ............. *F03D 13/22* (2016.05); *E02D 27/42* (2013.01); *E02D 2250/0023* (2013.01);
  (Continued)

(58) Field of Classification Search
  CPC ....... E02D 27/42; E02D 27/425; F03D 13/22; Y02E 10/728
  See application file for complete search history.

(56) References Cited

U.S. PATENT DOCUMENTS

| | | | |
|---|---|---|---|
| 6,119,413 A * | 9/2000 | Shaw ..................... | E04H 9/025 52/167.1 |
| 8,037,646 B2 * | 10/2011 | Wobben .................. | E02D 27/42 52/126.3 |

(Continued)

*Primary Examiner* — Gisele D Ford
(74) *Attorney, Agent, or Firm* — J.H. Lin Patent Law P.C.; John H. Lin

(57) ABSTRACT

Embodiments of the present foundation for onshore wind turbines comprise one solid cap structure, one tubelike upright cylindrical structure and a concrete corbel structure. All are constructed of high-strength cast-in-place reinforced concrete. The tubelike cylindrical structure has a purposely enlarged inner diameter than the wind turbine tower. The tubelike cylindrical structure has a wall thickness of 2 to 4 feet and embeds to the ground from 25 to 60 feet. The cap structure is constructed within the encompassed space of the tubelike cylindrical structure and seals the top of the tubelike structure. The anchor bolting system comprises anchor bolts, nuts, washers and embedment ring and is embedded in the reinforced concrete of the solid cap structure at the lower part and bolts the wind turbine tower flange to the solid cap structure. The corbel structure has a trapezoid shape in the section view with the top side is about 1 to 3 feet wider than the bottom side which is about 1 to 3 feet wide and is circumferentially arranged below the cap structure to reinforce the joints of the cap structure and the tubelike cylindrical structure. The ledge of the corbel starts from the outer edge beyond the embedment ring, and the lower part of the corbel structure extends to the tubelike cylindrical structure. A trenching method is tailored to construct the tubelike cylindrical structure, and guiding beams can be repeatedly used to direct the trenching, maintain the mud slurry level for trenching and provide a working mat for placement of the reinforcement cages, anchor bolting system and concrete. Other construction auxiliaries including mud slurry and water can be repeatedly utilized. The foundation constructed with the preferred embodiments can be used to support wind turbines and similar tower structures.

11 Claims, 14 Drawing Sheets

(52) U.S. Cl.
    CPC ........ *E04H 12/12* (2013.01); *F05B 2240/912* (2013.01); *F05B 2260/301* (2013.01)

(56) References Cited

U.S. PATENT DOCUMENTS

| | | | | |
|---|---|---|---|---|
| 8,051,627 | B2* | 11/2011 | Schiffer | E02D 27/42 52/854 |
| 8,359,798 | B2* | 1/2013 | Armbrecht | E02D 27/425 52/297 |
| 10,738,436 | B1* | 8/2020 | Wang | E02D 27/425 |
| 2002/0124502 | A1* | 9/2002 | Henderson | E04H 12/085 52/296 |
| 2011/0138706 | A1* | 6/2011 | Voss | E04B 1/4157 52/173.1 |
| 2013/0199117 | A1* | 8/2013 | Tuominen | E02D 27/42 52/297 |
| 2014/0260023 | A1* | 9/2014 | Henderson | E02D 27/50 52/295 |
| 2018/0320335 | A1* | 11/2018 | Jeon | F03D 13/25 |
| 2019/0010722 | A1* | 1/2019 | Lockwood | E04H 12/12 |
| 2019/0293053 | A1* | 9/2019 | Liu | E02D 27/42 |
| 2020/0208612 | A1* | 7/2020 | Wang | E02D 27/425 |

* cited by examiner 1-1: See FIG. 3 for Section View
2-2: See FIG. 4 for Section View
3-3: See FIG. 5 for Section View 4-4: See FIG. 7 for Section View 5-5: See FIG. 9 for Section View 6-6: See FIG. 11 for Section View 7-7: See FIG. 13 for Section View

CIRCULAR CAN-SHAPE FOUNDATION AND CONSTRUCTION METHOD FOR ONSHORE WIND TURBINES

BACKGROUND OF THE INVENTION

Field of the Invention

The invention pertains to the field of foundation engineering. More particularly, the invention pertains to a foundation that looks like a circular can-shape and comprises a tubelike cylindrical structure, a solid cap structure that seals the tubelike cylindrical structure at the top, and a corbel concrete structure that reinforces the connections of the tubelike cylindrical structure and the cap structure. An anchor bolt system that includes anchor bolts, washers, nuts and an embedment ring is embedded within the concrete of the cap structure. The inner diameter of the tubelike cylindrical structure is purposely enlarged and is larger than that of the wind tower flange that the anchor bolt system is bolted. The corbel concrete structure with its ledge starts from a point beyond the embedment ring and extends to the cylindrical structure. A trenching method is tailored to build the tubelike cylindrical structure, and guiding beams can be repeatedly used to direct the trenching, maintain the mud slurry level if needed and provide a working mat for placement of the reinforcement cage, anchor bolt system and concrete. Other construction auxiliaries including mud slurry and water can be repeatedly utilized. The foundation constructed with the preferred embodiments can be used to support wind turbines and similar tower structures.

DESCRIPTION OF RELATED ART

My earlier U.S. Pat. No. 10,738,436 B1 entitled Tubular Foundation for Onshore Wind Turbine Generators discloses cast-in-place tubular-like foundation for wind turbines, my abandoned Application Pub. No. U.S. 2020/0208612 A1 discloses a tree-root like pile-foundation to support wind turbines. The disclosures of which are incorporated herein by reference as if fully set forth. The prior art cited in the patent and application may also be relevant to the Circular Can-Shape Foundation and Construction Method for Onshore Wind Turbines of this invention.

Various forms of foundations utilizing general structural and functional features heretofore have been known. Those included disclose U.S. Pat. Nos. 1,048,993, 2,347,624, 2,706,498, 2,724,261, 3,186,181, 3,382,680, 3,600,085, 3,842,608, 3,963,056, 4,228,627, 4,618,287, 4,842,447, 5,228,806, 5,379,563, 5,586,417, 5,826,387, 7,533,505, 7,987,640, 8,161,698, 9,670,909, 9,347,1979,534.405 B1, 9,937,635 B2, 10,648,187 B2, 9,938,685 B2, 10,309,074 B2, 10,738,436 B1 etc. However, these previously invented foundations do not include the forms and features of the instant invention, and the combined forms and features of the instant invention enable the presented invention heavy duty as well as adaptive, constructible and cost-efficient. The invented foundation comprising features disclosed results in fully utilizing the further and deeper ground to resist tremendous overturning moment loadings. The present foundation results in very low vertical and horizontal deflections with surprisingly satisfactory translational and rotational stiffness under wind loadings transferred from wind turbines. In the meanwhile, the construction method is fast, cost-efficient and environmentally friendly.

U.S. Pat. No. 1,048,993 to C. Meriwether discloses a simple and inexpensive construction method of reinforced concrete caisson sunk in a usual way. The caisson may be filled with concrete and then works as a pier. The caisson is pre-casted into tubular sections of concrete; heavy reinforcements and metal rings which are in a bell and spigot joint are used in section ends. The rod is tensioned and extended through the connecting rings embedded partially inside of the reinforced concrete. The rod works as a tie to connect the embedded rings which are spaced inward of the inner peripheries of the concrete tube and do not embed fully in the concrete wall. The Meriwether's caisson is a pre-casted concrete pier with a relatively large diameter, no solid cap structure and the corbel structure included as the forms and features as the instant invention. Further, in contrast with using pre-stressed reinforcements, cast-in-place reinforced concrete is used to construct the comprised forms and features of the instant invention.

U.S. Pat. No. 2,374,624 to B. J. Schwendt discloses a precast foundation with concrete bolted together intended for supporting transportation signal masts. The foundation is embedded in the ground, but the precast sections impose size limitations and thus the foundation can only support light superstructures which subject to relatively small overturning moment. The present foundation comprises a tubelike cylindrical structure, a solid cap structure and a corbel structure, and cast-in-place reinforced concrete is used to construct the comprised forms and features of the instant invention. Thus, the forms and features comprised can resist tremendous overturning moment loadings from tall superstructures with surprisingly high translational and rotational stiffness.

U.S. Pat. No. 2,706,498 to M. M. Upson discloses a pre-stressed tubular concrete structure for use as pipe conduits, piles and caissons. The structural tubular structure is pre-casted and can be assembled one by one with joint means at the end. Tension is applied to the longitudinal reinforcing steel placed in the pre-served holes and grout then is poured into the holes to make the steel and concrete bond tightly. The Upson's structure is pre-stressed and not suitable for use as foundations for wind turbine generators or other tall structures which subject to tremendous overturning moment. The joint means the connections for the pipes are not rigid, which may cause problems in the stiffness of the foundation. And, the structure would be difficult to transport to the wind farm site. In contrast with using pre-casted structure, cast-in-place reinforced concrete is used to construct the comprised forms and features of the instant invention, and thus the construction results in very high translational and rotational stiffness, and it is convenient to transport construction materials to the construction site.

U.S. Pat. No. 2,724,261 to E. M. Rensaa discloses a method attaching a pre-cast concrete column to a supporting base, the diameter of the column is relatively small, and the base typically embeds in the shallow subsurface. Rensaa's method is rather for installation of the pre-cased column to the base, and the Rensaa's entire structure is not suitable for use as a large foundation for tall superstructure like wind turbine generators. In contrast, the present foundation is suitable to support tall superstructure enabled by the comprised forms and features that transfer and distribute loadings to further and deeper ground. In contrast with using pre-stressed reinforcements, cast-in-place reinforced concrete is used to construct the comprised forms and features of the instant invention.

U.S. Pat. No. 3,186,181 to R. K. Snow et al. discloses a method and apparatus of filling the pile shells with concrete to address the problems caused by turbulent air that segregates the rocks from cement in long pile shells. The apparatus is a pre-compression chamber, which holds the concrete from segregating and discharges the concrete to the bottom of the pile shells. The Show's invention is rather a method to overcome the airs in cement when constructing a long pile shell, not as the present foundation improves the structure's engineering behavior by the comprised forms and features. Cast-in-place reinforced concrete is used to construct the comprised forms and features of the instant invention with no concerns regarding the air retained in construction.

U.S. Pat. No. 3,382,680 to T. Takano discloses a pre-stressed concrete pile section comprising a tubular body of concrete with a pair of annular metal discs at opposite ends. The invention provides a pre-stressed concrete pile or pile section which results in an improved structure particularly designed to enable effective pre-tensioning of the axial reinforcement, which takes the form of reinforcing steel wires and is high in structural strength. The pre-stressed axial reinforcing steel wires are bonded with concrete, and the steel wires have enlarged head to anchor to the steel ring embedded in concrete. Assembly the reinforcing system and applying pre-stress is cumbersome, and, the principles of the Takano's pre-stressed concrete pile is different from the present foundation, which comprises forms and features to improve the engineering behavior by transferring and distributing the loadings to further and deeper ground. In contrast with using pre-stressed reinforcements, cast-in-place reinforced concrete is used to construct the comprised forms and features of the instant invention.

U.S. Pat. No. 3,600,865 to F. Vanich discloses a single column borne house erected and supported on a cast in place foundation pillar. The column is bolted to the pillar while beams are bolted to the column as cantilever beams. The foundation pillar is supported on a large diameter pile or inserts into the ground with a small pit that will be used to place concrete. In contrast, the present foundation comprises features and forms to transfer and distribute the tremendous loadings to further and deeper ground, cast-in-place of reinforced concrete is used to construct the comprised forms and features of the instant invention. Further, no pillar is used in the instant invention.

U.S. Pat. No. 3,842,608 to L. A. Turzillo discloses a method of installing a pile using screw-like means to drill the hole for the pile. Then cementitious material is then poured into the hole, and a pile is formed. Turzillo's invention is rather a construction method than improving the engineering behavior as the present foundation by utilizing the comprised features and forms to transfer and distribute loadings to further and deeper ground.

U.S. Pat. No. 3,963,056 to A. Shibuya et al. discloses pre-stressed concrete piles, poles, or the like. Pillar covered with an outer shell of steel pipe on a circumferential surface of a cylindrical pre-stressed concrete tube or a pillar-shaped pre-stressed concrete pole at least one end being in an independent state to the concrete article. The invention provides the joint effects of the good compressive strength of the said pre-stressed concrete tube or pole and the good bending strength by adding the outer shell. However, the outer steel shell filled with concrete can be regarded as increasing the pile diameter. The Shibuya's structure is not as the present foundation improves the structure's engineering behavior by the comprised forms and features which transfer and distribute loadings to further and deeper ground. Further, cast-in-place reinforced concrete is used to construct the comprised forms and features of the instant invention, not using pre-stressed reinforcements.

U.S. Pat. No. 4,228,627 to J. C. O'Neill discloses a reinforced foundation structure for supporting high light pole by using a plurality of vertically extending reinforcing rod assemblies with the top bolted to a base plate on the bottom of the pole. The structure extends downwardly into a vertical earth bore of relatively small diameter. Accordingly, the O'Neil structure is not capable of being used to support superstructure subject to the high overturning moment or being placed under high unit compressive loading. In contrast, the present foundation improves the structure's engineering behavior by the comprised forms and features which transfer and distribute loadings to further and deeper ground, and cast-in-place reinforced concrete is used to construct the comprised forms and features of the instant invention.

U.S. Pat. No. 4,618,287 to F. Kinnan discloses a method for establishing in-ground footings to support poles by using a threaded steel casing. The casing is threaded into the ground, and grout has penetrated the ground via the holes through the steel casing. The diameter of the casing and the depth threaded into the ground are relatively small. Accordingly, Kinnan's structure is not capable of being used to support superstructure subject to the high overturning moment or being placed under high unit compressive loading. Kinnan's invention is rather a construction method than improving structure's engineering behavior as the present foundation by the comprised forms and features, which transfer and distribute loadings to further and deeper ground. Further, typical cast-in-place reinforced concrete is used to construct the comprised forms and features of the present foundation, no grout is used to improve the existing ground.

U.S. Pat. No. 4,842,447 to J. J. Lin discloses a fabrication method and device of hollow reverse circulation piles. Firstly, a central hollow portion is installed with a movable sand barrel between which and the surrounding reinforcing cage, a positioning device for a movable sand barrel is installed. Upon the start of work, grouting is poured to a scheduled height from the bottom of the pile bore first. Grouting is then poured between the pile bore wall and the outer wall of the movable sand barrel. Lin's invented construction method and the device is expensive, and the construction process is impractical. In contrast, the present foundation improves the structure's engineering behavior by the comprised forms and features which transfer and distribute loadings to further and deeper ground. Further, cast-in-place reinforced concrete is used to construct the comprised forms and features of the present foundation, and no need for such extra device for construction comprised in Lin's art.

U.S. Pat. No. 5,228,806 to C. J. De Medieros et al. discloses a gravity pile for sub sea platform foundations. The gravity pile comprises a series of pile sections made from two concentric tubes, the annular space between which is filled with an elevated specific weight composition. Individual pile sections can be joined together utilizing tubular connecting rings welded to the ends of the sections. Medieros' foundation is complicated in construction, and thus not cost-efficient. Moreover, the welding connecting the gravity piles is vulnerable to high fatigue, cyclic loadings provided by wind turbine generators. In contrast, the present foundation improves the structure's engineering behavior by the comprised forms and features which transfer and distribute loadings to further and deeper ground, and cast-in-place reinforced concrete is used to construct the comprised forms and features, no welding is needed. The present foundation utilizes the resistance from the further and deeper ground, not the weight of the foundation, to resist the tremendous overturning moment loading.

U.S. Pat. No. 5,379,563 to C. R. Tinsley discloses an anchoring assembly by which heavy machinery may be anchored to a foundation. Anchoring plates used to fasten the anchors in the lower and upper parts are separate. Such separated plates and anchors may be pulled out when the overturning moment is large. Thus, Tinsley's foundation is not capable of supporting superstructures such as wind turbine generators which subject to high overturning moments. In contrast, the present foundation is suitable to support tall superstructures by bolting the base flange of the superstructure to the foundation. The present foundation improves the structure's engineering behavior with comprised forms and features which transfer and distribute loadings to further and deeper ground, and cast-in-place reinforced concrete is used to construct the comprised forms and features of the instant invention. The embedment ring used in the present foundation is intact, not separated, to ensure pullout safety.

U.S. Pat. No. 5,586,417 to A. P. Henderson et al. discloses a hollow, cylindrical pier foundation that is constructed of cementitious material poured in situ between inner and outer cylindrical corrugated metal pipe (CMP) shells. The foundation is formed by CMPs placed within a ground pit. External and internal spaces beyond the CMPs need to be backfilled. In contrast, the present foundation does not use CMPs to form the foundation, it utilizes a trenching method to trench the ground and to form the tubelike structure and no need to excavate a large pit to place the CMPs, and no backfill and no compaction is needed. Moreover, the instant invention comprises a solid cap structure and a corbel structure to reinforce the joints of the cap structure and the tubelike structure, that Henderson's invention does not have.

U.S. Pat. No. 5,826,387 to A. P. Henderson et al. discloses an upright cylindrical pier foundation that is constructed of cementitious material. Compared with U.S. Pat. No. 5,586,417, the pier is formed similarly by using the corrugated metal pipe (CMP) shells. The upper part of the foundation extends radially from the tubelike pier. The tower supporting the wind turbines are bolted to the extended partition of the foundation top with the short anchor bolts, whereas the entire foundation is bolted to the ground with long bolts arranged in rows of smaller diameters. Refer to comparisons between the present foundation with U.S. Pat. No. 5,586,417, the Henderson's art, the present foundation does not use CMPs to form the structural members, it utilizes ground to shape and form the foundation and no need to excavate a pit to place the CMPs, and no backfill and no compaction is needed. The instant invention comprises forms and features that include a tubelike structure, a solid cap structure and a corbel structure to reinforce the joints of the tubelike structure and the cap structure, the forms and features are different from Henderson's previous art.

U.S. Pat. No. 7,533,505 B2 to A. P. Henderson discloses a circular concrete cap foundation poured in-situ within a perimeter forming using corrugated metal pipes (CMPs). The CMPs are set at top or within an excavated pit and enclosing a series of circumferentially spaced pile anchors. The pile anchors are also formed with corrugated metal pipes (CMPs) which are set deep in subsurface soils and poured with cementitious material. Refer to the comparisons with U.S. Pat. No. 5,586,417, the present foundation does not use CMPs to form, manufacture the comprised forms and features. The present foundation utilizes the ground to shape and forms the foundation and no need to excavate a pit to place CMPs, no backfill, and no compaction is needed. Moreover, the present foundation comprises forms and features that include a tubelike structure, a cap structure and a corbel structure reinforcing the joints of the tubelike structure and the cap structure, no pile anchor is used.

U.S. Pat. No. 7,987,640 B2 to B. Ollgaard et al. discloses a technique preventing water intrusion into the foundation by adding sealing compound and cover into foundation concrete. The technique is helpful to increase the lifetime of the foundation but not improving the mechanical behavior of the foundation by the included forms and features.

U.S. Pat. No. 8,161,698 to P. G. Migliore discloses a circular foundation using fiber reinforced concrete with circular reinforcement rods. The foundation includes a vertical stanchion that rests on the bottom of an excavated hole with a relatively large diameter, vertical anchor bolts and radical reinforcements are placed in the hole, and then concrete is poured into the hole. The invention essentially follows the principle of a single pier foundation, a stanchion and radial reinforcement around the stanchion are placed within the concrete of the pier to increase the internal strength of the structure. Thus, Migliore's invention only improves the material properties within the pier, not related to the foundation shape and interactions with surrounding soils. In contrast, the present foundation comprises forms and features that include a tubelike cylindrical structure, a solid cap structure and a corbel structure reinforcing the joints of the tubelike structure and the cap structure. Migliore's invention does not have such forms and features. Moreover, typical cast-in-place reinforced concrete is used to construct the comprised forms and features without using any fiber to strengthen the structural members.

U.S. Pat. No. 9,670,909 to N. Holscher discloses a foundation constructed with a plurality of concrete segments. The segments are pre-casted with curved surfaces, and two sheaths are preserved to install tensioned wires to tie up the segments. In contrast, typical cast-in-place concrete reinforced with rebars is used to construct the present foundation, no pre-casted segment is needed.

U.S. Pat. Nos. 9,534,405 B1, 9,937,635 B2, 10,648,187 B2 to A. Phuly disclose a foundation constructed with a mat on the foundation bottom and ribs connected to the bottom mat and construction method. The Phuly's inventions do not include any forms and features that the instant invention comprised of which include a tubelike cylindrical structure, a solid cap structure and a corbel structure reinforcing the joints of the tubelike structure and the cap structure. Moreover, Phuly's construction method needs to dig a large open excavation pit, and forms need to be used to form the forms and features that his invention comprised. Backfill and compaction are needed after the construction for the comprised forms and features are completed. The construction for the instant invention uses trench cutters, diggers clamshell buckets, or long-reach excavators to trench the ground, guiding beams and slurry mud may be repeatedly used to help the construction. The construction for the forms and features of the instant invention does not need any forms, the ground will be used to shape the forms and features comprised in the instant invention.

U.S. Pat. No. 9,938,685 B2 to D. E. Krause discloses a foundation comprised of the beam and pile anchors for towers. The foundation comprises of 6 post-tensioned concrete beams that project radially outwards from the central hub assembly, which is formed of steel or precast concrete segments. The beam connects to a pile cap with two rods, and the pile is anchored to the ground. Typical cast-in-place reinforced concrete is used to construct the forms and features of the instant invention, no precast or post-tensioned members included in Krause's art. Moreover, the instant invention comprised forms and features include a tubelike cylindrical structure, a solid cap structure and a corbel structure reinforcing the joints of the tubelike structure and the cap structure, no beams projects radially outwards that are included in Krause's art.

U.S. Pat. No. 10,309,074 B2* to R. Tozer discloses a precast concrete foundation of modular construction for telecommunication or wind turbine towers. The foundation comprises precast concrete modules that are bolted with a slab-base. The instant invention comprises cast-in-place concrete structures including a tubelike cylindrical structure, a solid cap structure and a corbel structure reinforcing the tubelike structure and the cap structure, no bolt is used to make the structures connected.

U.S. Pat. No. 10,738,436 B1 to Wang et al. discloses a foundation comprised of a tubelike pier, a circular grade beam and a plurality of arm grade beams that connect to the pier and the circular grade beam. Short bolts and embedment ring are assembled just below the bottom of the arm grade beam, and the lower part of the pier thus subject to tension. No part of the structures can be replaced or repaired in the future as they are fix-connected. In contrast, the instant invention comprises the forms and features which include a tubelike structure, a solid cap structure and a corbel structure reinforcing the joints of the tubelike structure and the cap structure, the forms and features of the instant invention are different from Wang's previous art.

Based on the above comparisons with state-of-the-art technique concerning the present foundation, it is finally concluded that the present foundation comprises different forms and features from the above listed previous art.

SUMMARY OF THE INVENTION

The foundation of the instant invention is unique because the forms and features of the instant invention are not even looking like previous arts. In summary, the instant invention looks like a can that is embedded in the ground and the instant invention comprises a relatively long tubelike pier embedded into the ground, a solid cap structure sealing the tubelike cylindrical structure at the top, and a corbelled concrete structure reinforcing the joints of the tubelike structure and the cap structure. The tubelike cylindrical structure is arranged on the most outer circumference of the system, hollow, and embedded in the ground. The diameter of the tubelike cylindrical structure is purposely enlarged and is much larger than the tower base of the wind turbines, which are bolted to the cap structure with a bolting system that is embedded in the concrete of the solid cap structure. The solid cap structure is built within the inner space of the tubelike cylindrical structure and seals the tube as a cap. The corbel structure is circularly arranged below the cap structure with a trapezoid shape in section view, the ledge of the corbel structure starts from a point beyond the embedment ring and extends to the cylindrical structure, so it can reinforce the joints of the tubelike cylindrical structure and the cap structure greatly.

A trenching method is tailored to be utilized to construct the invented foundation. The two guiding beams are utilized for the construction of the tubelike cylindrical pier. They can be used repeatedly to provide a working mat for trenching equipment, guide the direction of the trenching, maintain slurry above the ground surface and work as forms to build the tube-shape foundation. A spillway in the guiding beams was designed to collect the slurry and water that may be repeatedly used for construction.

For a conventional concrete pier foundation, all loadings from the superstructure are transferred and taken by the pier and then the ground around the pier provides resistance to balance the loadings. As for the invented foundation, the loads from superstructure like the wind turbines have to be transferred to the solid cap structure first. The capture structure than distribute the loads to the tubelike structure but works as a reducer that reduces the loads, and thus the requirements on the tubelike cylindrical structure. The corbel structure strengthens the function of the solid cap structure and the tubelike cylindrical structure.

For the present foundation, the tubelike cylindrical structure has a purposely enlarged diameter and is arranged on the most outer side of the system. The cap structure is built with the inner space of the tubelike structure and seals the tube wall. The anchor bolt system is embedded in the concrete of the solid cap structure and bolt the tower of the wind turbine down to the cap structure. So, the cap structure supports wind turbines directly and transfers the loadings of the wind turbines to the tubelike cylindrical structure which not only has a purposely enlarged diameter but also embed very deep in the ground. Thus, the foundation can support superstructures like wind turbines that subject to heavy loadings which may in a format of the overturning moment, torques, vertical dead loads, and/or horizontal shear. The purposely enlarged diameter of the tubelike cylindrical structures also provides a space for the corbel concrete structure, the ledge of the corbel structure can start from a point beyond the embedment ring that embeds in the concrete of the cap structure and extends to the tubelike cylindrical structure to reinforce the joints of the cap structure and the tubelike cylindrical structure.

The connections among the tubelike cylindrical structure, the solid cap structure and the corbel structure are rigid. Such connections ensure the structures work together to support the wind turbine that is bolted to the solid cap structure.

The anchor bolt system, which is widely used in the industry, bolts the superstructure and foundation together, and transfer loadings from the wind turbine tower to the present foundation. Thus, the foundation is loaded by the wind turbines supported therefrom. The anchor bolts try to pull the turbine tower down to the concrete of the cap structure and transfer the tensile loading to the embedment ring. Reactions are generated between the embedment ring and the concrete, the concrete resists the embedment ring to be pulling out by the bolts, whereas the compression is applied to the concrete on the other half circumference. On the other end of the top of the foundation, the concrete supports the turbine flange and the concrete subjects to the compression from the flange. The two resistance forces from the concrete and the bolts form a coupled moment to resist the overturning moment of the turbine. In the present foundation, the anchor bolts are approximately extended to the bottom of the cap structure.

More details related to mechanical analysis are described in the following paragraphs.

The tensile and compressive reactions from the invented foundation form a coupled moment that resists the overturning moment transferred from superstructure such as wind turbines. More specifically, the overturning moment loadings and the weight of wind turbines generate compressions on the foundation top, where high-strength grouting material is used to prevent breaking of the foundation top concrete. In the meanwhile, overturning moment loadings also cause tensions in anchor bolts. The compression reaction from the high-strength grouting and the tension reaction from the anchor bolts form a coupled moment to resist the overturning moment loadings that the superstructure subject and are transferred to the invented foundation. The coupled moment formed in the solid cap structure will also be transferred to the tubelike cylindrical structure, and the joints of the cap structure and the tubelike cylindrical structure will be reinforced by the corbel structure.

Horizontal shear that is transferred from wind turbines is also transferred and distributed to the foundation. The solid cap structure takes the transferred shear and continuously transfers and distributes it similarly to the tubelike cylindrical structure.

In contrast to conventional foundations or previous arts, the tubelike cylindrical structure has a purposely enlarged diameter than the cap structure and the wind tower base. Since the tubelike cylindrical structure has a purposely enlarged diameter and embeds deeply in the ground, the invented foundation can take significant loadings generated by the wind turbines or other tower structures, and the acceptance standards will be easier to be reached.

The design engineers are familiar with the forms and features that the present foundation comprises. The instant invention follows the current industry standards/codes that the design engineers are familiar with. Hand calculations can provide closed-form solutions for design use, while 3-D geotechnical and structural design and analysis software are better as they can provide more accurate solutions.

Regarding the construction, the two guiding beams are made of pre-casted concrete reinforced with rebars. They can be used repeatedly to provide a working mat for trenching equipment, guide the direction of the trenching, maintain slurry above the ground surface and work as forms to build the tubelike cylindrical structure. Since the solid cap structure is constructed within the encompassed space of the tubelike structure and seals the cylindrical structure at the top, and the corbel structure extends into the cap structure at the top and the tubelike structure in the bottom, no form is needed when placing concrete.

No special construction equipment is needed. Normal construction equipment and construction procedure can be used to construct the present foundation.

The backhoe can be used to dig the shallow excavation pits, whereas trenching machines including trench cutters, diggers, clamshell baskets, long reach excavators, can be used to dig the trench that forms the tubelike pier. Slurry mud may be used to prevent trench sloughing, and the slurry may be recycled and reused on-site with pumps and mud tanks.

No formworks as well as excavation, backfilling and compaction is needed, the construction procedure is simplified, and the construction time is saved.

Finally, the present invention to be specifically enumerated herein is to provide a Circular Can-Shape Foundation and Construction Method for Onshore Wind Turbines following the proceeding forms and features of manufacture. The forms and features of the foundation comprised are economically feasible, durable, reliable and cost-efficient. Compared with industry-widely used invert T-type spread foundation under the same loadings with the same site conditions, approximately 25 to 35% of the construction cost can be saved if the present foundation is constructed accordingly.

These together with other objects and advantages which will become subsequently apparent reside in the details of construction and operation as more fully hereinafter described and claimed, reference being had to the accompanying drawings forming a part hereof, wherein like numerals refer to the like parts throughout.

BRIEF DESCRIPTION OF THE DRAWING

FIG. 7 illustrates the base tower flange sits in the top of the grouting trough and the bolts pass through preserved holes in the flange and the washers and nuts are used to fasten the bolts.

FIG. 9 shows two bolts pass through the predrilled holes in the embedment ring, and the washers and nuts below the embedment ring are used to fasten the bolts.

FIG. 10 shows the inner and outer guiding beams and the bolts bolting the beam sections as well as the reinforcements for the corbel and the tubelike cylindrical structure.

FIG. 11 shows reinforcements were placed to the trench and the corbel place, guiding beams are not moved away yet.

FIG. 12 shows the top reinforcements for the solid cap structure, the bolting system and a template ring which is used to build the shape of the grouting trough and centralize and verticalize the bolts.

DETAILED DESCRIPTION OF THE PREFERRED EMBODIMENTS

Figure 1:
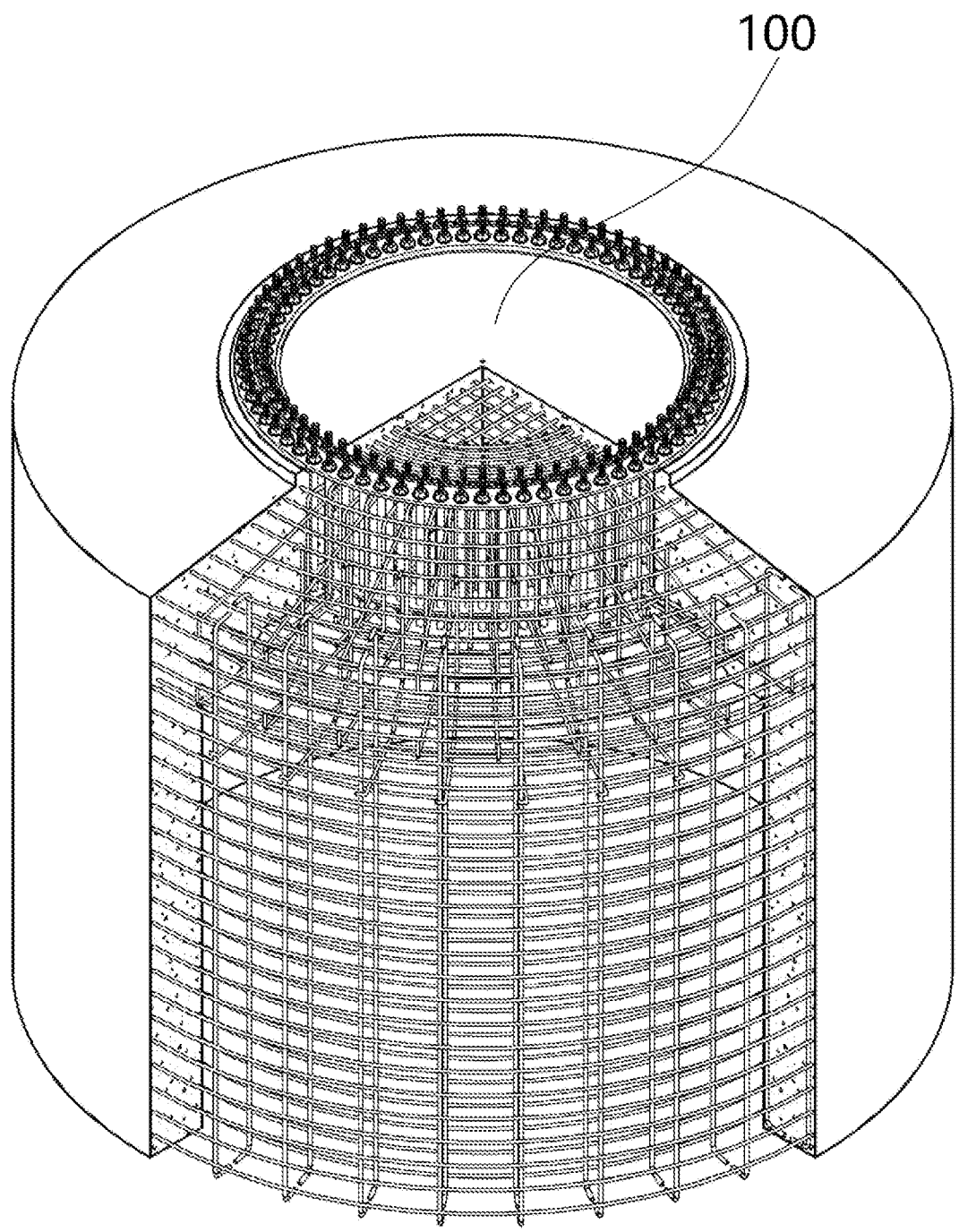
FIG. 1 is a three-dimensional illustration of the foundation constructed following a preferred embodiment of the present invention and ready to have the wind towers and turbines to be supported.
Figure 2:
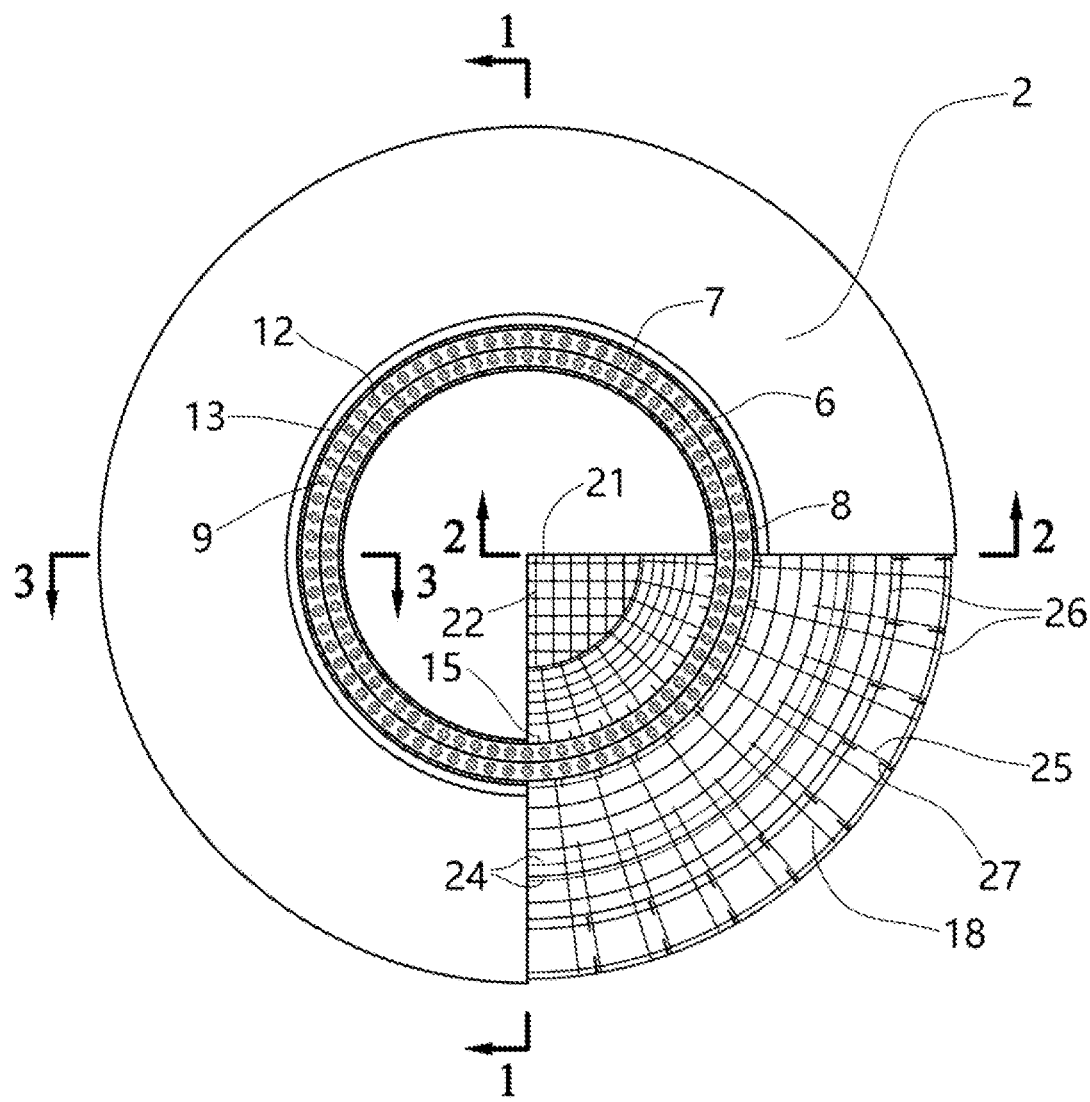
FIG. 2 is a plan view of the invented foundation that the upper part of FIG. 2 shows the top surfaces of the solid cap structure, the tower flange and the bolting system that embeds in the solid cap structure, the lower part of FIG. 2 shows reinforcements within the solid cap structure.
Figure 3:
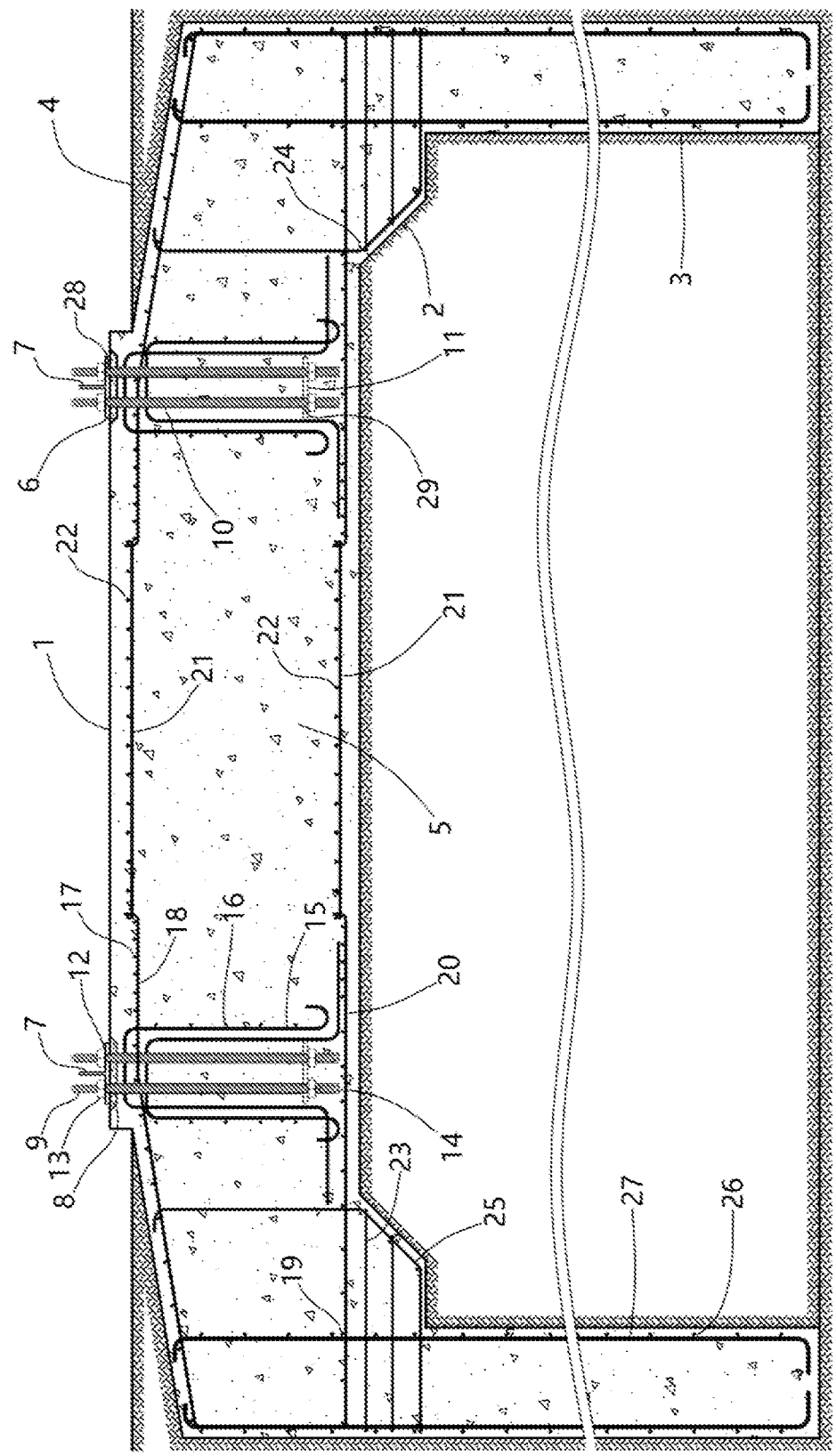
FIG. 3 is a fragmentary vertical section view of the completed foundation with the base tower installed. The upper part of the FIG. 3 illustrates the tower base, anchor bolt system, the solid cap structure, the tubelike pier, and the corbel structure whereas the lower part only shows the pier that is embedded in the deep ground.

Referring now more specifically to the drawings, especially FIGS. 1, 2, and 3, the numeral 100 generally designates the foundation of the instant invention. The foundation 100 preferably includes a solid cap structure 1, a circular arranged corbel structure 2, and a tubelike cylindrical structure 3. Structures 1, 2, and 3 are concentric. The tubelike cylindrical structure 3 is circumferentially arranged on the most outer side of the system, structures 1 and 2 are built within the tubelike structure 3. Structure 3 is hollow with inner and outer wall diameters of approximately twenty-five to thirty-five feet, the wall thickness is approximately two to four feet. The solid cap structure 1 is a cap-like solid reinforced concrete structure that seals the top of the tubelike cylindrical structure 3, the thickness of the solid cap structure 1 varies from four (4) feet to six (6) feet, and the diameter of the cap structure 1 equals the inner diameter of the tubelike cylindrical structure 3. A bolting system, including the embedment ring 11, anchor bolts 9, washers 12 and nuts 13, the PVC sleeves 10 for the anchor bolts 9 above the embedment ring 11, the PVC cap 14 for the anchor bolts 9 below the embedment ring 11, is embedded in the reinforced concrete structure 1, and the base tower sits on the grouting trough 8 which sits on the top of the concrete structure 1. The anchor bolts 9 hold the tower flange 6 and fastened with washers 12 and nuts 13. The base tower flange 6 connects to base tower wall 7.

The embedment ring 11 is embedded in the lower part of the solid cap structure 1. The solid cap structure 1 has a flat surface in the center part, protrudes from the ground surface 4, and the top surface of the solid cap structure 1 slopes down into the ground 4 from the edges that just outer of the anchor bolting system. The slope of the surface of the solid cap structure is approximately in the range of 1% to 3% radically downwards. The bottom surface of the solid cap structure 1 is flat and connects with the tubelike cylindrical structure 3.

The corbel structure 2 is concentric with the solid cap structure 1 and the tubelike cylindrical structure 3. The ledge of the corbel structure 2 stars a point beyond the bolting system at the bottom of the solid cap structure 1 and expands to the tubelike cylindrical structure 3. The section of the corbel structure 2 is trapezoid-shape, and its top side is approximately two (2) to four (4) feet wider than the thickness of the tubelike cylindrical structure 3, its bottom side is approximately one (1) to two (2) feet less than its top side.

Reinforcement bars are shown in FIGS. 1, 2 and 3. As shown in FIG. 2 and FIG. 3, numeral 15 designates the U-shape rebars, which are arranged circumferentially and hooped the bolting system, numeral 16 designates the hooping rebars which are circumferentially and arranged from the bottom to the top the U-shape rebars. Numeral 17 shown in FIG. 2 and FIG. 3 designates the circumferentially arranged rebars for the top reinforcement of the solid cap structure 1, and Numeral 18 shown in FIG. 2 and FIG. 3 indicates the radically arranged rebars for the top reinforcement of the solid cap structure 1. Numerals 19 and 20 are shown in FIG. 3 and designate the reinforcement rebars for the bottom reinforcement of the solid cap structure 1, similar to numerals 17 and 18. Within the bolting row circles, two rebar meshes at the top and the bottom of the center of the solid cap structure 1 are used to make the reinforcement more reasonably spaced, and the numerals 21 and 22 are shown in FIG. 3 and designate the horizontal and perpendicular rebars for the rebar meshes. Numeral 23 is shown in FIG. 3 designates rebars that hoop the circumferentially arranged reinforcement 24 for the corbel structure 2. Numeral 25 shown in FIG. 3 is link rebars that form the reinforcement cage for the corbel structure 2 and extend into the solid cap structure 1 and hook with the top reinforcement rebars 17 and 18 for the solid cap structure 1. Numeral 26 designates the circumferentially arranged rebars for the tubelike cylindrical structure 3, and numeral 27 designates the vertical rebars for the tubelike cylindrical structure 3, which are even-spaced arranged along the circumference of the tubelike cylindrical structure 3 and extend into the solid cap structure 1 and hook with the top reinforcement Rebars 17 and 18.

Figure 4:
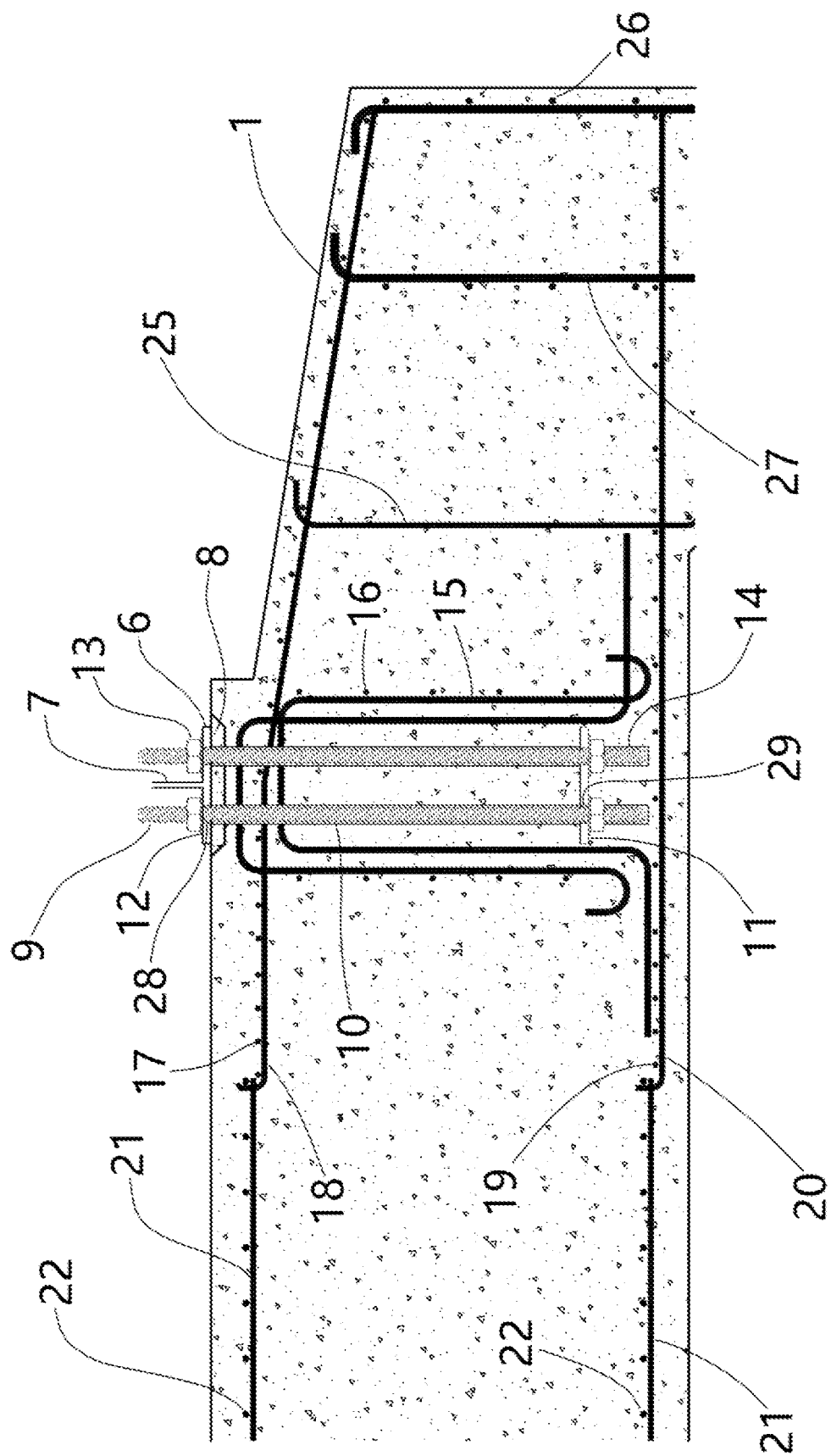
FIG. 4 is a fragmentary vertical section view of the solid can structure and the bolting system embedded in the reinforced concrete structure of the solid cap structure, FIG. 4 also shows the base tower is bolted to the solid cap structure.

As shown in FIG. 4, the rubberized asphalt membrane 4 is set at the outer sidewall of the tubelike pier 1, and a grouting trough 9 is set on the top of the wall of the tubelike pier 1. Base tower flange 7 sits on the grouting trough 9, and the base tower flange 7 connects the tower wall 8. A bolting system bolts the tower flange 7 to the tubelike pier 1. The bolts used in the bolting system have a plurality of anchor bolts 10, which are not shown in FIG. 4 but can be seen in the vertical section view of FIG. 5. The anchor bolts 10 cross the preserved holes 25 in the base tower flange 7, washers 12 and nuts 13 are used to fasten the bolts to the based tower flange 7. The preserved holes 25 in the base tower flange 7 cannot be seen in FIG. 4 due to washers 12 and nuts 13 but can be seen in the section view of FIG. 5. The bolts 10 are round, screwed in the body and have square-shaped head 15. The square-shaped head 15 is approximately three to six inches long and can be used to disassembly the anchor bolts 10 used for the current phase and install the anchor bolts 10 with a higher grade in the future phase.

FIG. 4 is a fragmentary vertical section view of the solid can structure and the bolting system embedded in the reinforced concrete structure of the solid cap structure. The bottling system comprises of embedment ring 11, Anchor bolts 9, washers 12, nuts 13. The embedment ring 11 embeds in concrete 5 at the lower part of the solid cap structure 1, the anchor bolts 9 passes through the preserved holes 28 in the tower flange 6, the predrilled holes 29 in the embedment ring 11, washers 12 and nuts 13 are used to fasten the bolts and apply the post-tension to the anchor bolts 9. PVC sleeve 10 wraps up the anchor bolts 9 above the embedment ring 11, and PVC cap 14 is used to cover the exposed anchor bolts 9 below the embedment ring 11, so the anchor bolts 9 will not bond with concrete 5. U-shape rebars, designated by numeral 15, are arranged circumferentially with even spaces along the two circular rows of anchor bolts 9. Circumferential rebars 16 were arranged from the top to the bottom of the U-shape rebars 15 to hoop the U-shape rebars 15, thus rebars 15 and 16 form a reinforcement hoop for the bolting system to ensure the anchor bolts 9 will not be pulled out. The solid cap structure 1 has a flat top surface in the center, and slopes downwards radically from the edges near the anchor bolts 9. The slope is in the range of 1% to 3% so vegetation soil placed above the foundation can drain water away. The solid cap structure 1 has a flat bottom. The center of the solid cap structure 1 has two layers of rebar meshes, and the horizontal rebars and the perpendicular rebars of the rebar meshes are designated by the numerals 21 and 22 respectively. Numerals 18 and 20 designate radial rebars which extend radially and are arranged circumferentially with even spaces for the top and the bottom reinforcement of the solid cap structure 1, numerals 17 and 19 designates the circumferential rebars for the top and the bottom reinforcements of the solid cap structure 1. All rebars, designated by numerals 17, 18, 19 and 20 overlap with the horizontal rebars 21 and the perpendicular rebars 22 for the rebar meshes in the central zones of the solid cap structure 1. Numeral 27 designates vertical rebars extended from the tubelike cylindrical structure, which are arranged circumferentially with an even space along the circumference of the tubelike cylindrical structure 2, numeral 25 is the framing rebars extended from the corbel structure 2. Both vertical rebars 25 and 27 extend to the top reinforcement of the solid cap structure 1 and hook with rebars 17 and 18. Numeral 26 designates the hooping rebars that hoop the vertical rebars 27.

Figure 5:
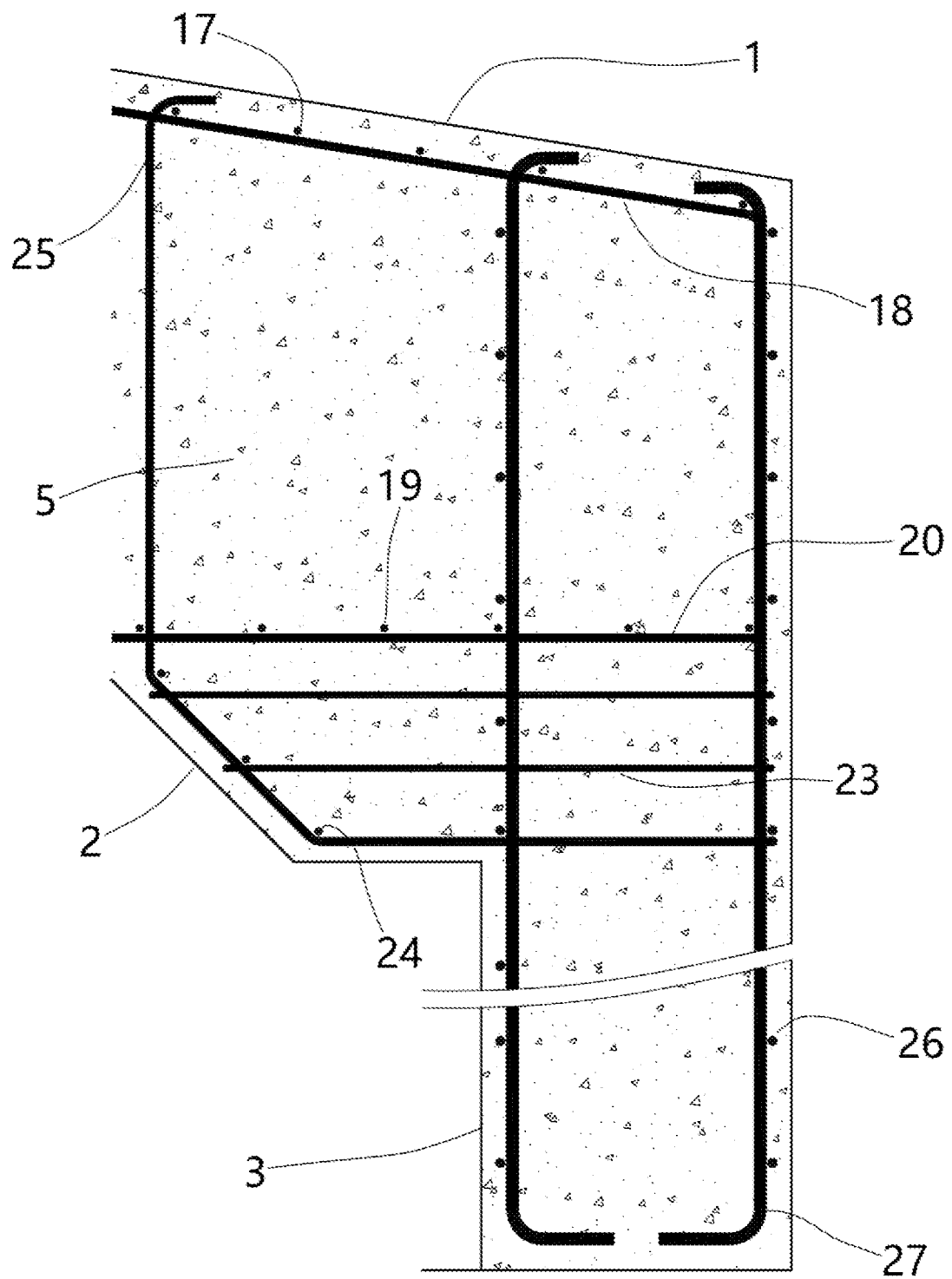
FIG. 5 is a fragmentary vertical section view of the corbel structure which focuses on the reinforcing rebars and the geometry of the corbel structure.

As shown in FIG. 5, a corbelled structure 2 has a trapezoid-shape section, connects the solid cap structure 1 with its top side, and extends into the tubelike cylindrical structure 3. Its top side is approximately one (1) to three (3) feet wider than the bottom side which is approximately one (1) to three (3) feet wide. Framing rebars 25 extends from the bottom of the corbel structure 2 into the solid cap structure 1 and hook the top reinforcements for the solid cap structure 1. Rebars 24 are circumferential shape rebars, evenly arranged along with the framing rebar 25 for the corbel structure 2. Rebars 23 hoops the rebars 25 and 24 for the corbel structure 2 as well as the vertical rebars 27 for the tubelike cylindrical structure 3.

Figure 6:
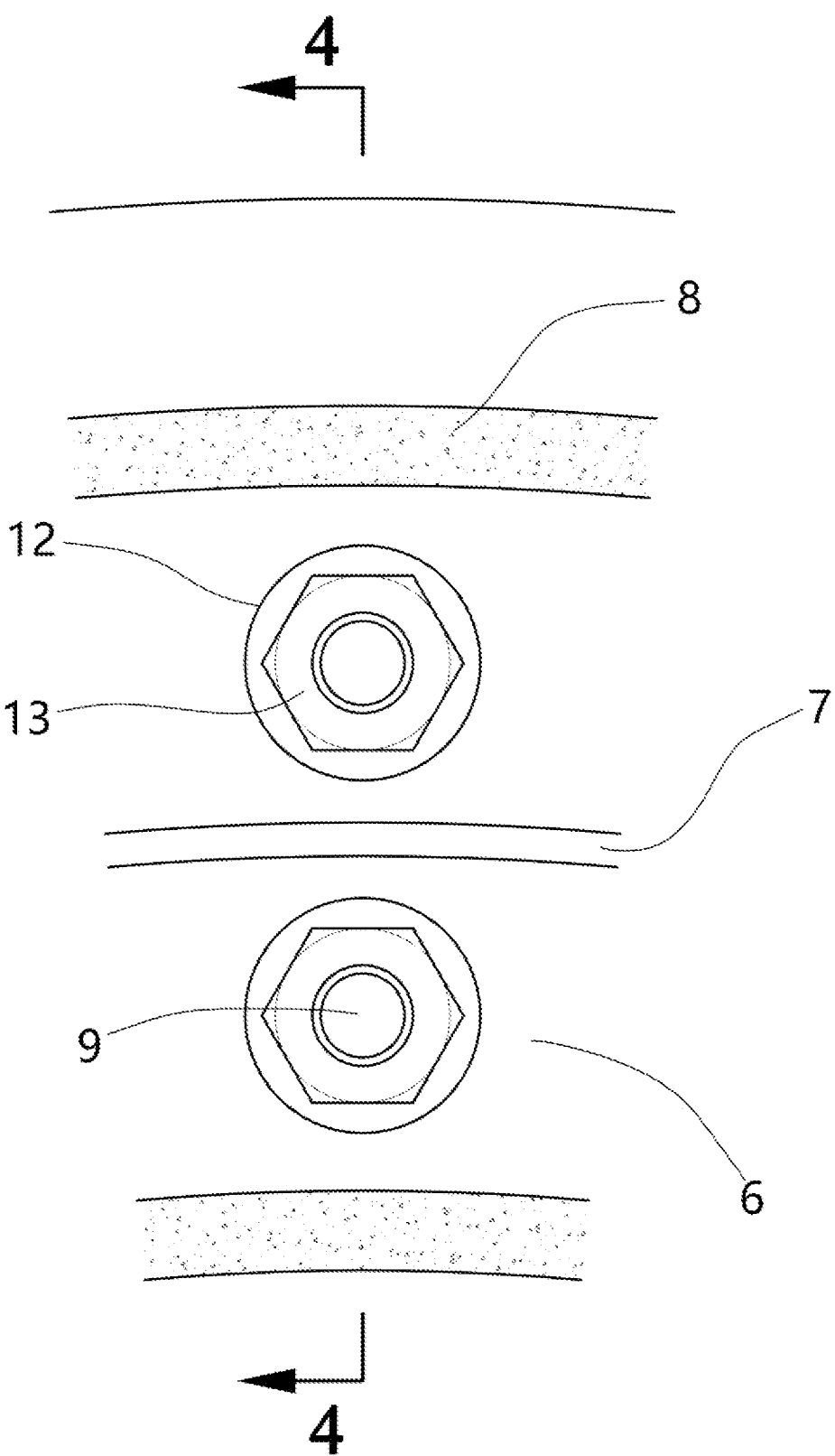
FIG. 6 is a fragmentary plan view of the invented foundation. It shows the projections of the bolting system, the grouting trough, and the base tower installed at the top surface of the solid cap structure.
Figure 7:
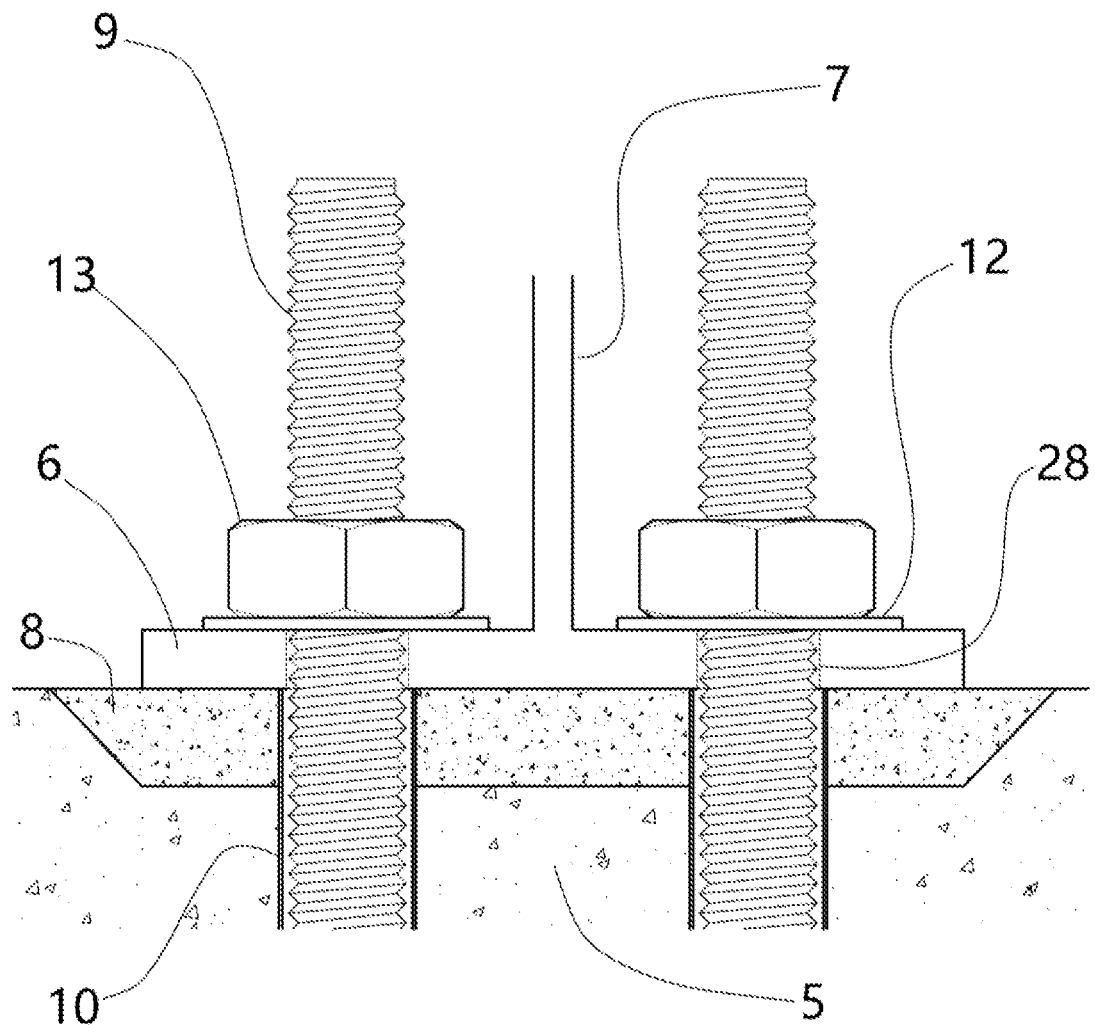
FIG. 7 shows the vertical section view of the grouting trough and the bolting system illustrated in FIG. 6.

As shown in FIG. 6 and FIG. 7, a grouting trough 8 sits on the top of the solid cap structure 1, a base tower flange 6 connected with the tower wall 7 sits at the top of the grouting trough 8. Two rows of the anchor bolts 9 which can be seen in FIG. 7 are arranged and extend to the lower part of the solid cap structure 1. The bolts 9 are round screwed steel rods and pass through the preserved holes 28 in the tower flange 6. Washers 12 and nuts 13 can fasten the bolts 9 to bolt the base tower flange 6 to the grouting trough 8 and the solid cap structure 1. The bolts 9 are isolated from the concrete 5 by using the PVC sleeve 10.

Figure 8:
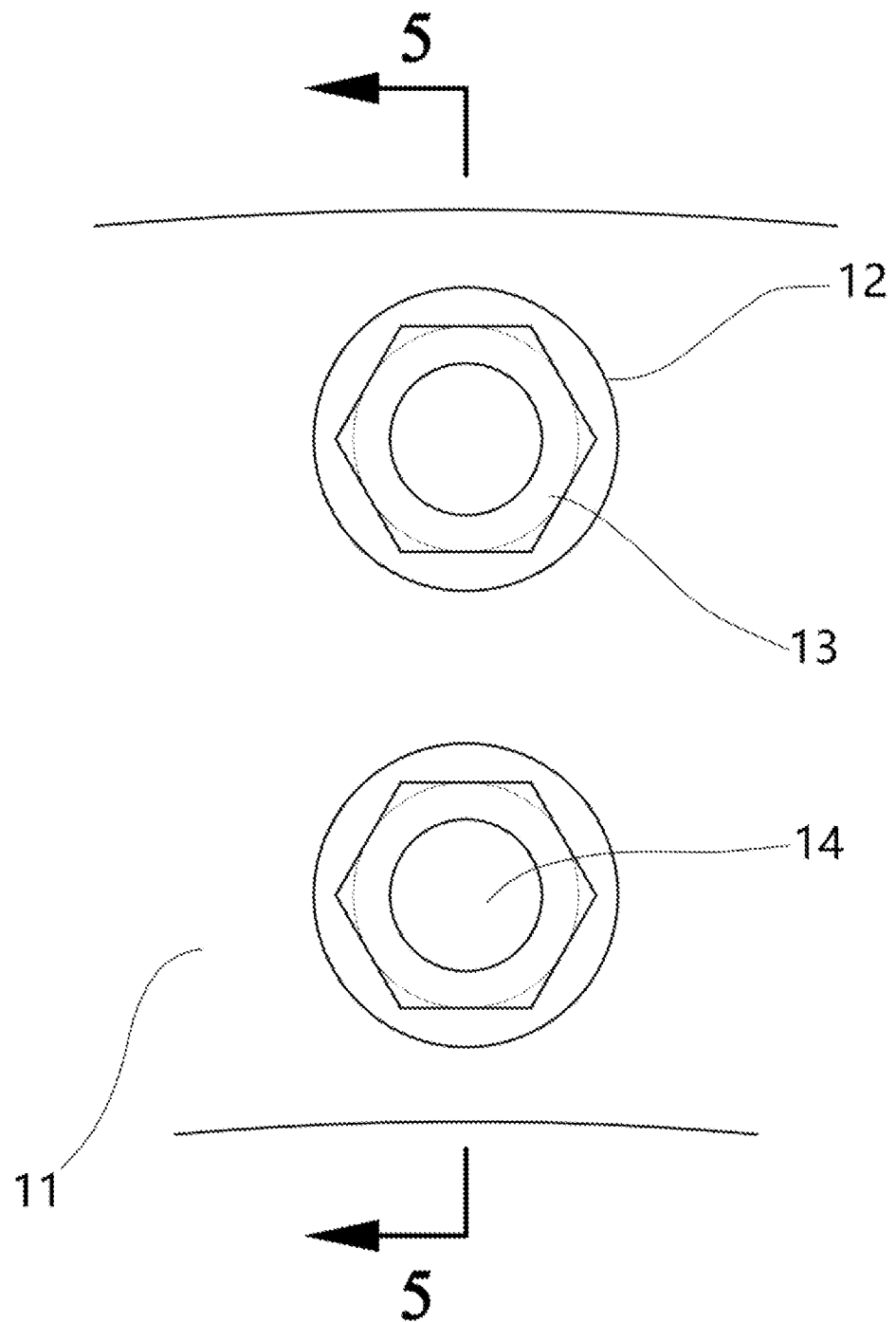
FIG. 8 is a fragmentary bottom plan view of the embedment ring and bolting system that embed in the reinforced concrete of the solid cap structure. It shows the projections of the geometric line, the bolt, washer, and nut.
Figure 9:
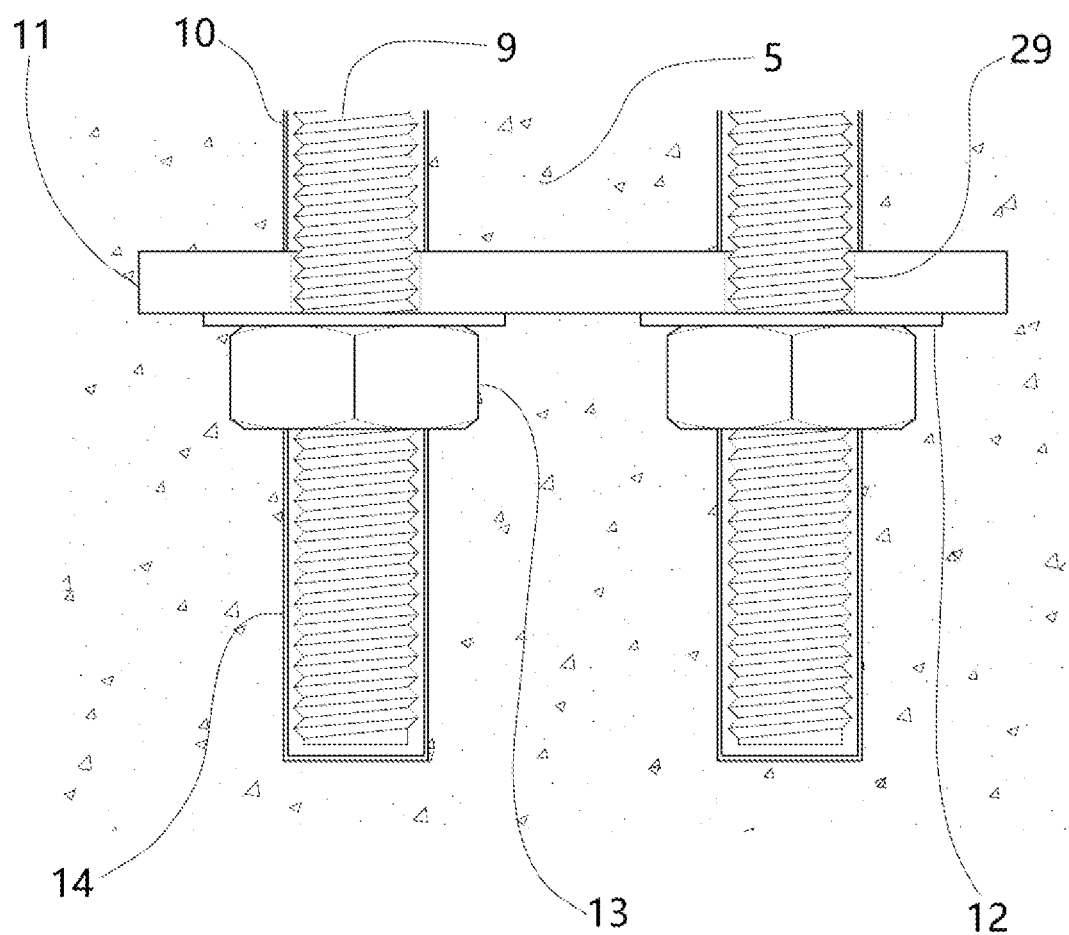
FIG. 9 shows the vertical section view of the embedment ring and bolting system illustrated in FIG. 8.

As shown in FIG. 8 and FIG. 9, embedment ring 11 embeds in the concrete of the solid cap structure 1. The embedment ring 11 is an "O" shaped circular ring which is made of steel plate with a certain thickness and width. The anchor bolts 9 passes through the predrilled holes 29 in the embedment ring 11, and the washers 12 and nuts 13 are screwed over the bolts 9 to ensure the bolts 9 cannot be pulled out from the embedment ring 11. PVC sleeve 10 and PVC cap 14 are used to isolate the bolts 9 from the concrete 5.

Figure 10:
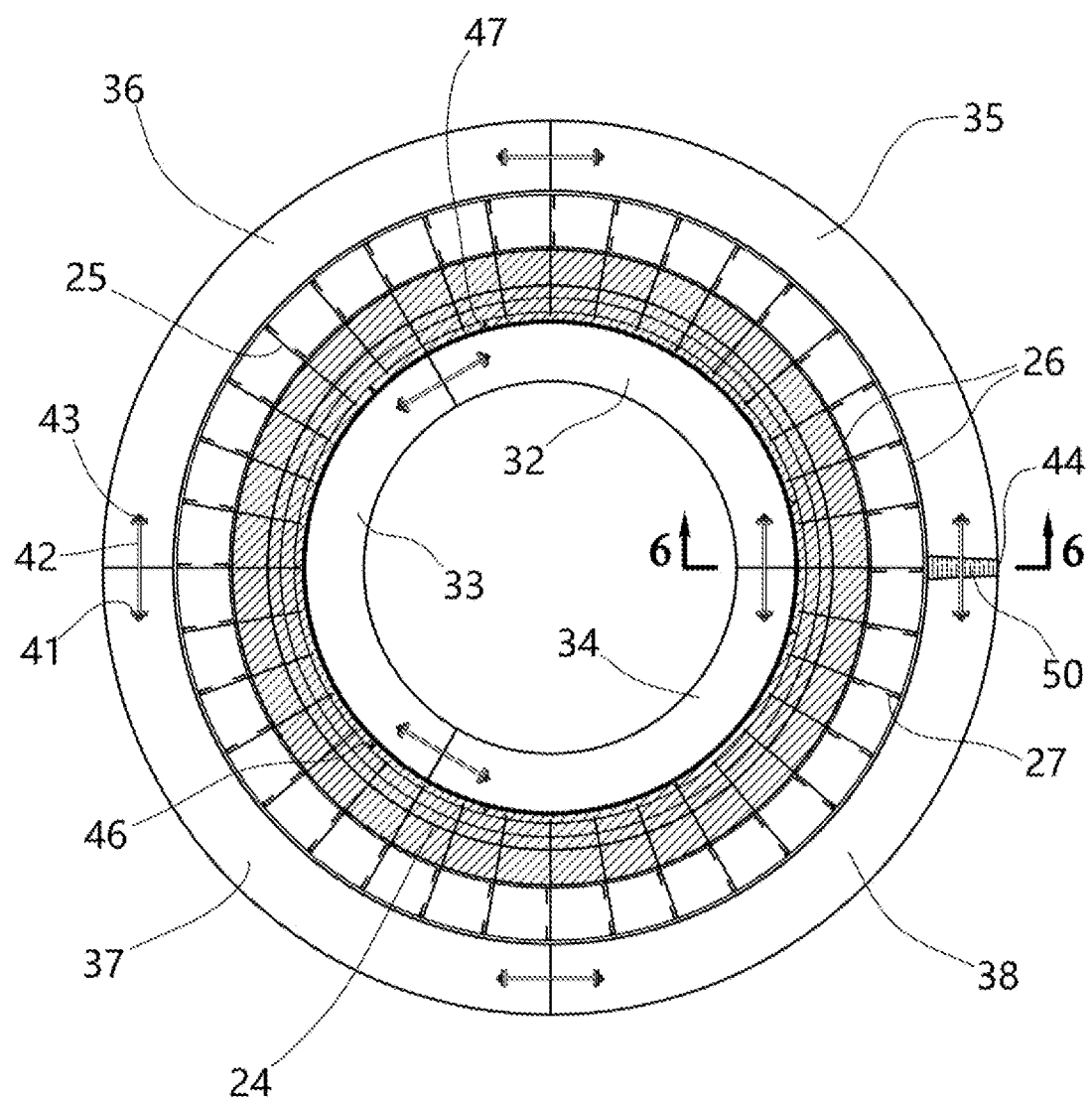
FIG. 10 is a top plan view of the foundation in construction.
Figure 11:
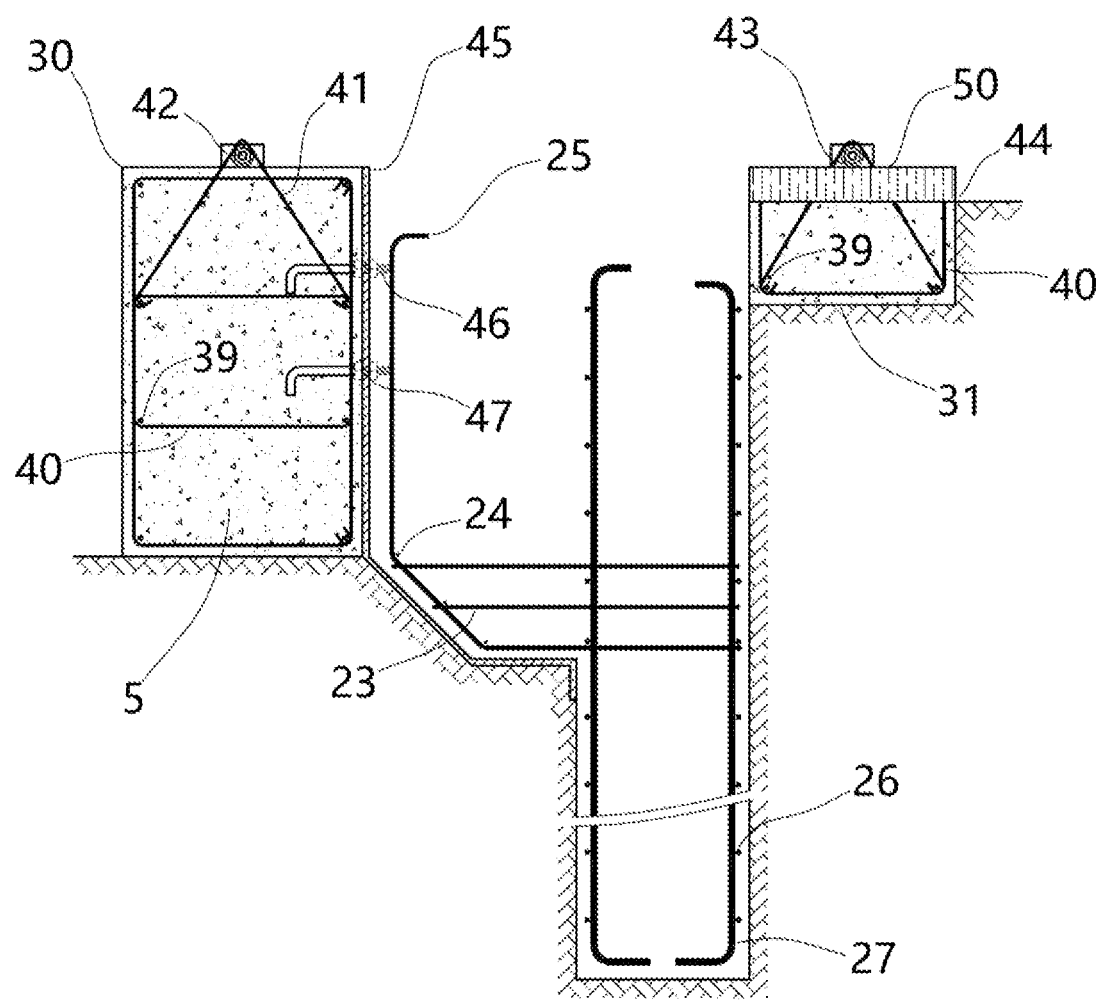
FIG. 11 is a vertical section view of guiding beams and spaces of the solid cap structure and the corbel structure and the trench for the tubelike structure.

As shown in FIG. 10 and FIG. 11, the inner guiding beam 30 has three sections 32, 33 and 34, which are installed to make a circular solid beam in the inner space of the corbel structure 2. The outer guiding beams 31 has four sections 35, 36 37 and 38, which are installed to make a circular solid beam in the outer space of the tubelike cylindrical structure 3. Anchor bolts 42 passes through rebar hooks 41, washers and nuts 43 are used to fasten the bolts 42, the guiding beams 32,33,34, 35, 36, 37 and 38 are then bolted together to function well as expected. As shown in FIG. 10, a spillway 44 is preserved in the pre-casted reinforcement concrete beams to collect the slurry and water that may be used repeatedly during the construction.

As shown in FIG. 11, reinforcements are placed for the corbel structure 2 and the tubelike cylindrical structure 3, but the concrete is not placed yet. The inner guiding beam 30 is placed in the excavated pit where the solid cap structure 1 will be built, the outer guiding beam 31 is placed just near the sidewall the solid cap structure 1, or the tubelike cylindrical structure 3, 32,33,34, 35, 36, 37 and 38 are pre-casted reinforced concrete structures, which can be used repeatedly to construct the corbel structure 2 and the tubelike cylindrical structure 3. The inner guiding beam 30 is thicker than the outer guiding beam 31. The inner guiding beams also have bolts 46 that pre-embedded in the concrete, a steel plate designated by 45, which has a shape that matches the shape of the corbel structure 2, is bolted to the inner guiding beams with washers and nuts 47. When concrete is placed to the level at the bottom of the solid cap structure 1, the inner guiding beam 30 with the steel plate 45 can be removed, and a space for the solid cap structure 1 is provided.

Figure 12:
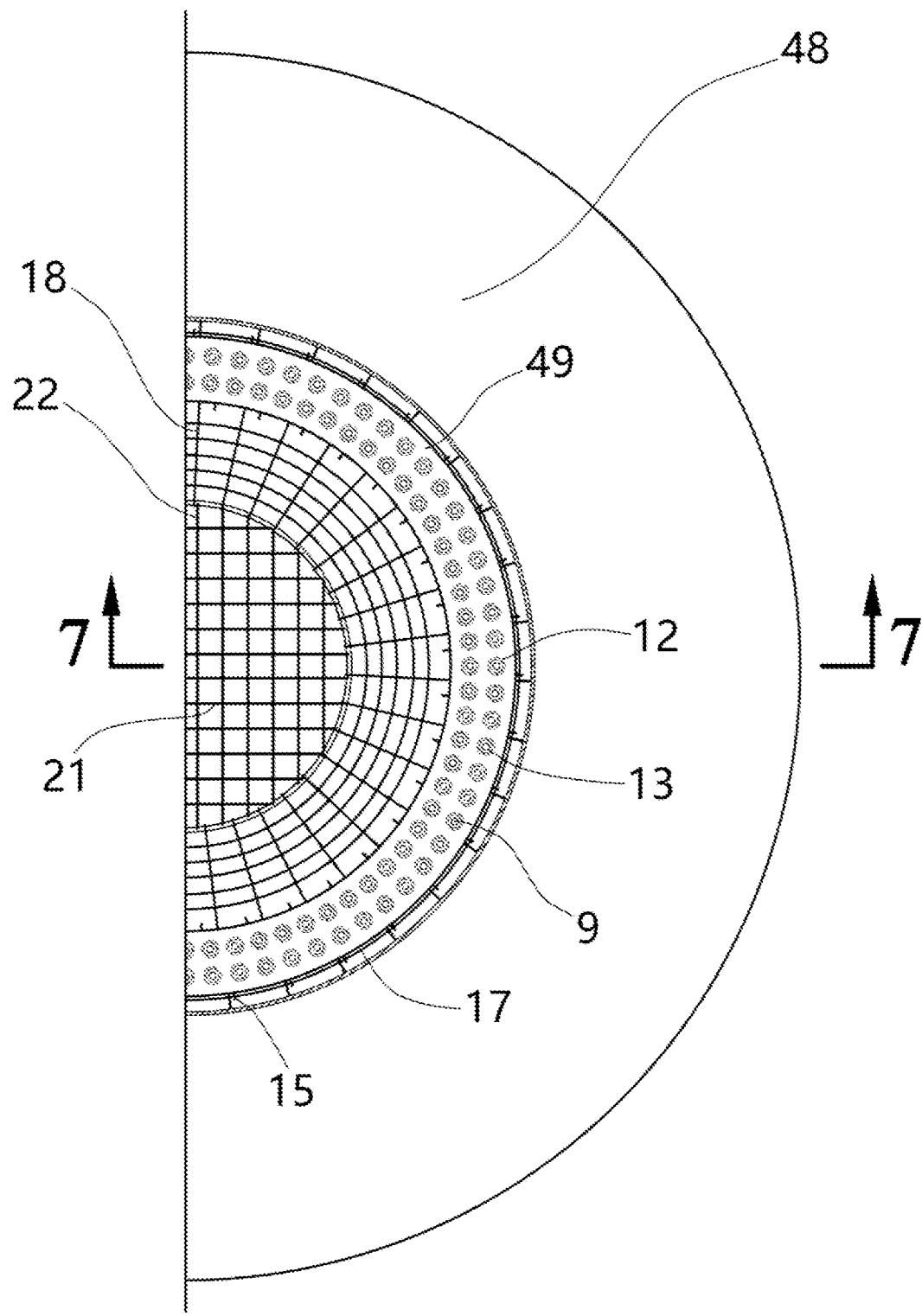
FIG. 12 is an enlarged fragmentary top plan view of the foundation during construction.
Figure 13:
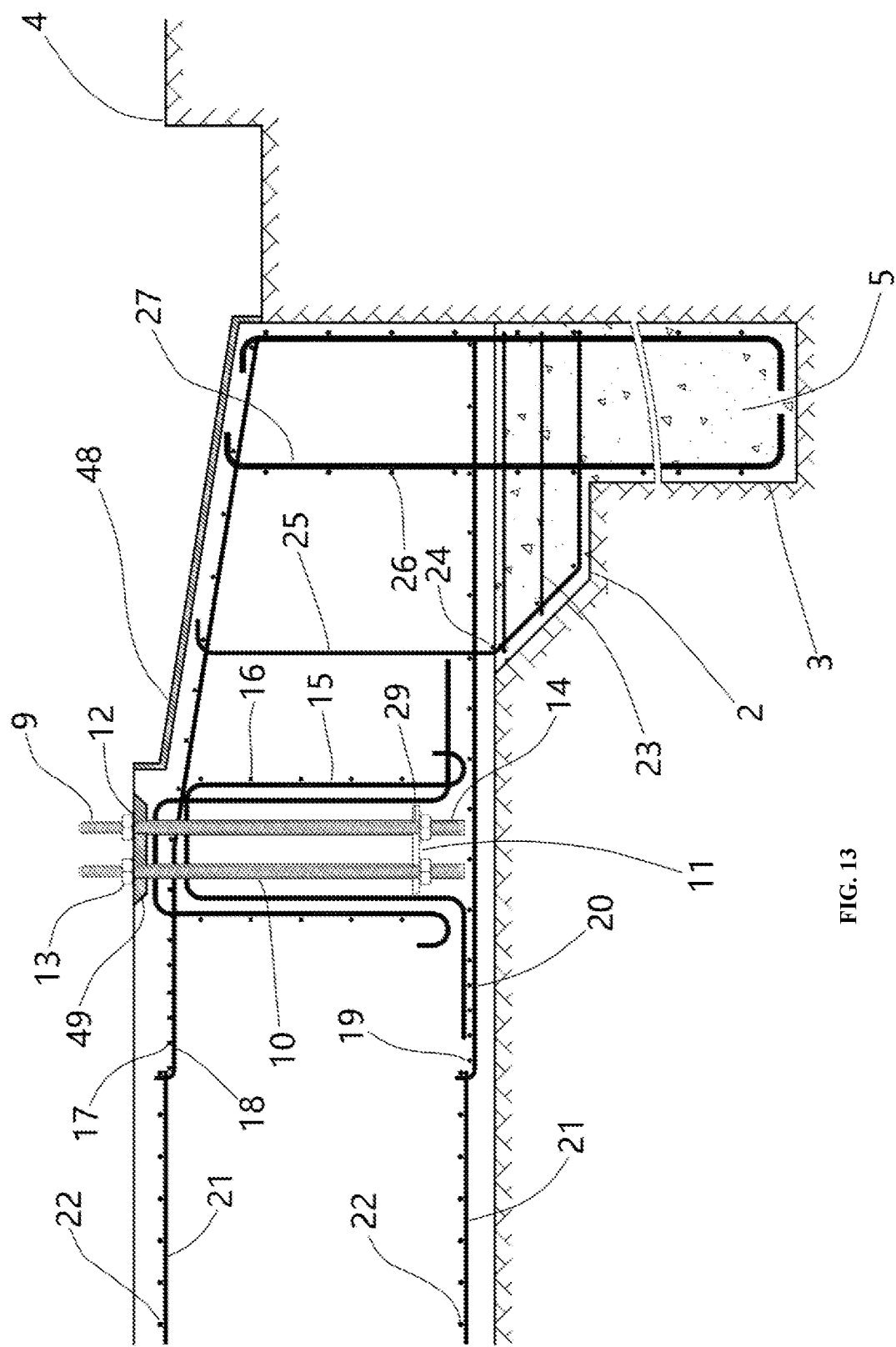
FIG. 13 is a fragmentary vertical section view of the solid cap structure, the corbel structure and the tubelike structure under construction. Reinforcements for different structures and at different locations were shown in FIG. 13 and the template ring and the concrete surface maker are also shown in FIG. 13.

FIG. 12 and FIG. 13 show the construction process that the concrete is placed for the solid cap structure 1. The guiding beams 30 and 31 have been removed, the reinforcement cage with the bolting system for the solid cap structure 1 is placed the concrete has been poured. Numeral 48 in FIG. 12 and FIG. 13 designates a surface template that helps to form the top concrete surface of the solid cap structure 1, anchor bolts 9, washers 12 and nuts 13 are installed with a template ring 49. Rebars 15, 17, 18, 21, 22 can be observed in FIG. 12 but more rebars for the bottom reinforcements of the solid cap structure 1, designated by numerals 15, 16, 17, 18, 19, 20, 21, 23, 24, 25, 26 and 27 are observed. The template ring 49 is used to shape the grouting trough 8, centralize and verticalize the anchor bolts 9 that are installed to bolt the tower flange 6. When the concrete becomes relatively hardens, the template ring 49 shall be disassembled to leave a space for the grouting trough 8.

Figure 14:
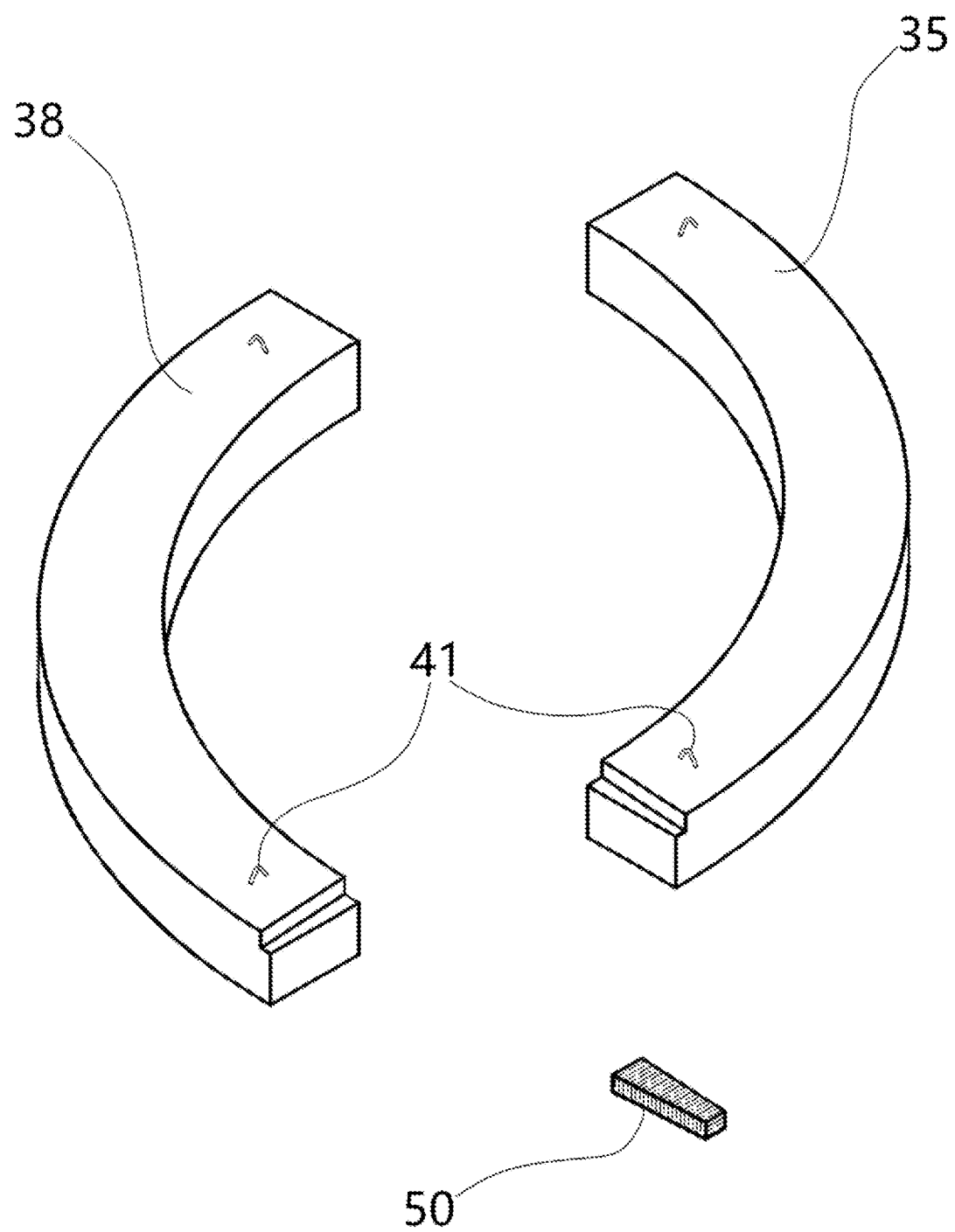
FIG. 14 is a three-dimensional illustration of the guiding beams that are tailored to construct the trench, the corbel and the cap. and the tubelike pier focusing on a spillway preserved in the guiding beams. A spillway and a wood wedge are illustrated which can be used to collect the slurry and the water which may be repeatedly used for construction.

FIG. 14 shows two outer guiding beam sections 35 and 38, Rebar hooks 41 are embedded within the concrete and will be used to hoist and bolting the guiding beams. A wood wedge 50 has the same dimension as the spillway 44 which is shown in FIG. 10 and preserved in the pre-casted guiding beams 35 and 38.

The following construction steps are tailored for the invented foundation, but they may be adjusted in accordance with the project conditions:

1. Make a construction plan, including preparation for the slurry recycle tanks, water tanks, etc. Rent or purchase equipment necessary for the construction. Set up auxiliary hanging structures to be used to hang steel cages and the anchor bolting system.
2. Level the construction site. Delineate the locations for the above-mentioned solid cap structure 1, the corbel structure 2 and the tubelike cylindrical structure 3.
3. Construct the guiding beams on site with appropriate dimensions and forming work. Excavate the construction pits with different elevations for different structures 1, 2 and 3. Hoist the guiding beams to the appropriate locations, bolt them together tightly.
4. Move the trenching equipment above the guiding beams, starting trenching. Mud slurry may be needed.
5. Assembled embedment ring 11 and anchor bolts 9, washers 12 and nuts 13. Template ring 49 is needed and washers 12 and nuts 13 also need to be assembled above the template ring 49, some washers 12 and 13 need to place below the template ring 49. The template ring 49 is used later to ensure the anchor bolts 9 to be positioned accurately, centralized and verticalized.

6. In the meanwhile, fabricate reinforcement for the solid cap structure 1. Install the installed bolting system into within the reinforcements for the solid cap structure 1.
7. Reinforcements for the corbel structure 2 and the tubelike cylindrical structure 3 can be fabricated together.
8. Continue the trenching work with appropriate equipment for the tubelike cylindrical structure 3, maintain the slurry level to prevent sloughing of the trench, if necessary.
9. Set up equipment such as pullies/cranes to hang the fabricated steel cage and make them ready on site
10. When the trench reaches the design depth, using recycling water to push the slurry out (i.e., replace the slurry with water). Open the spillway to flow the slurry out and collect the slurry to the slurry tanks.
11. When the water in the trench satisfies relevant industry standards, using pullies/cranes to place reinforcements in the trench.
12. Adjust steel reinforcement and anchor bolting system including the positioning and leveling, place concrete 5 with a tremie pipe from the bottom of the trench. The water level will rise and spill over spillway 44.
13. Stop placing concrete 5 when it reaches the bottom of the solid cap structure 1. Pump the water out if there is any.
14. Remove the inner guiding beams and outer guiding beams including the steel template 45 to shape the corbel structure 2, a space for the solid cap structure is provided.
15. Hoist the reinforcements for the solid cap structure with the bolting system installed within the reinforcements, adjust the rebars for the corbel structure 2 and the tubelike cylindrical structure 3 to make them hooking with the top reinforcement of the solid cap structure 1.
16. Adjust the positions of the bolting system, ensure the bolts 9 are centralized and verticalized.
17. Place concrete 5 for the solid cap structure 1. When the concrete is approximately placed to the designed surface level, vibrate the concrete per relevant construction standards, take concrete samples for testing, etc.
18. Place a concrete surface template 48 to cover the concrete surface, continue to place and vibrate the concrete.
19. Remove the template ring 49 and the concrete surface template 48 when concrete is relatively hardened, move the auxiliary structure for hanging away from the site. The grouting trough will be formed, and anchor bolts stay vertical.
20. Grouting the grouting trough. When it reaches the required strength, install the base tower, make the bolts 9 passes through the preserved holes 28 at tower base flange 6. Apply washers 12 and nuts 13.
21. When the grout and the concrete reach the required strength, apply tensions by fastening the nuts. Now, the base tower installation is completed.
22. Continued the tower erection and the turbine installation. Recover the site, including place vegetable soils, backfill the tanks for slurry or water ponding, etc. after the erection work is completed.
23. Move the equipment and auxiliaries to the next foundation site.

It is to be noted that the foundation 100 may be used for supporting many other different types of towers. The cost of the foundation and construction is reduced by saving the construction material. Cost for auxiliary construction measures can also be saved especially when the slurry and water be repeatedly used.

The foregoing is considered as illustrative only of the principles of the invention. Further, since numerous other modifications and changes readily will occur to those skilled in the art, it is not designed to limit the invention to the exact construction and operation shown and described, and accordingly, all suitable modification and equivalent may be resorted to, falling within the scope of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A circular can-shape foundation comprising a solid cap structure, a corbel structure and an upright tubelike cylindrical structure that are constructed of cast-in-place reinforced concrete, wherein the solid cap structure seals a top side of the tubelike cylindrical structure and the corbel structure reinforces a connection between the solid cap structure and the tubelike cylindrical structure along a circumferential wall of the tubelike cylindrical structure; wherein the corbel structure comprises rebars that hoop a reinforcement that is circumferentially arranged around the tubelike cylindrical structure.

2. The circular can-shape foundation of claim 1, wherein said the solid cap structure has a flat central top and a flat bottom.

3. The circular can-shape foundation of claim 1, wherein said the solid cap structure has an approximately 1% to 3% downwardly and outwardly sloped top surface beyond the flat central top.

4. The circular can-shape foundation of claim 1, wherein said the tubelike cylindrical structure supports the solid cap structure with an inner diameter that is larger than the wind turbine tower.

5. The circular can-shape foundation of claim 1, wherein said corbel structure has a trapezoid-shape section that has a top side and a bottom side, the top side being approximately 1 to 3 feet wider than the bottom side, which is approximately 1 to 3 feet wide.

6. The circular can-shape foundation of claim 4, wherein said tubelike cylindrical structure has a wall thickness of 2 to 4 feet and an embedment depth ranging from 25 feet to 60 feet.

7. The circular can-shape foundation of claim 4, wherein said tubelike, upright cylindrical structure is constructed by using a trenching construction method.

8. The circular can-shape foundation of claim 7, wherein said trenching construction method comprises using guiding beams to guide the trenching direction and maintaining a slurry level to prevent sloughing during trenching.

9. The circular can-shape foundation of claim 8, wherein said guiding beams comprise a spillway preserved in the guiding beams to flow slurry and water for repeated use.

10. The circular can-shape foundation of claim 1, wherein a bolting system is embedded in the solid cap structure and is hooped by rebars in the solid cap structure.

11. The circular can-shape foundation of claim 1, wherein the corbel structure and the upright tubelike cylindrical structure are submerged beneath a ground surface.

* * * * *